(12) United States Patent
Pope et al.

(10) Patent No.: US 7,916,730 B1
(45) Date of Patent: Mar. 29, 2011

(54) METHODS AND SYSTEM FOR SOLVING CROSS-CHIP-TRUNK CONTINUOUS DESTINATION LOOKUP FAILURE

(75) Inventors: Randal Pope, Seattle, WA (US); Qi Lu, Kirkland, WA (US); Bill Baumann, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 27 days.

(21) Appl. No.: 12/242,265

(22) Filed: Sep. 30, 2008

(51) Int. Cl.
*H04L 12/56* (2006.01)
*H04L 12/66* (2006.01)

(52) U.S. Cl. ........ 370/392; 370/389; 370/352; 370/354; 370/356

(58) Field of Classification Search .................. 370/235, 370/255, 389
See application file for complete search history.

(56) References Cited

U.S. PATENT DOCUMENTS

| | | | |
|---|---|---|---|
| 2002/0085585 A1* | 7/2002 | Tzeng | 370/475 |
| 2003/0118035 A1* | 6/2003 | Sharma et al. | 370/401 |
| 2006/0126535 A1* | 6/2006 | Sherman | 370/254 |

* cited by examiner

*Primary Examiner* — Huy D Vu
*Assistant Examiner* — Maria Sekul
(74) *Attorney, Agent, or Firm* — LeClairRyan (57) ABSTRACT

A method and system for preventing excessive flood packets from switching devices in a network for routing packets between a source station having an address and a destination station in the network having an address. A first packet directed toward the destination station is received over the network via an incoming traffic switch. The incoming traffic switch includes a table without the address of the destination station. The first packet is flooded over the plurality of switches. The flooded first packet is received at a front facing switch coupled to the destination station. The front facing switch has a table including the source address of the packet. The source address of packet is flushed from the table of the front facing switch. A response packet is sent from the destination station to the source station. The response packet is flooded to the incoming traffic switch. The flooded response packet is received at the incoming traffic switch. The table of the incoming traffic switch is updated with the address of the destination station.

24 Claims, 5 Drawing Sheets

METHODS AND SYSTEM FOR SOLVING CROSS-CHIP-TRUNK CONTINUOUS DESTINATION LOOKUP FAILURE

FIELD OF THE INVENTION

This invention generally relates to minimizing packet flooding of a network and more particularly, to a system and methods for reducing cross chip trunk continuous destination lookup failures by targeted learning table flushes.

BACKGROUND

Computing networks using packets to transmit data between devices are currently ubiquitous. The packets include a media access control (MAC) address for both the sending and the receiving network station. Virtual local area networks (VLANs) are used to create networks that are not bound by geography and provide flexibility in configuration. Such networks are faced with balancing traffic of the packets to ensure that devices on the network enjoy efficient service. Incoming and outgoing traffic on a network is often routed to different paths by network traffic managers in order to allow the most efficient transmission of data. Such transmissions occur over switches that carry traffic to be distributed to network stations.

In more complex networks, network traffic appliances may be used to assist in routing traffic. Such network traffic appliances include multiple blades that each act as switches to handle traffic for groups of network stations. Each blade handles traffic for network stations with different MAC addresses that may be known to a particular blade that routes traffic associated with the station such as outgoing traffic, but not to other blades on the network traffic appliance that may not be associated with the station. In a trunk line such as a T1 that spans devices in a network, incoming and outgoing data packets across the trunk can hash to any network station based on the nature of the network traffic. With a favorable distribution of traffic this normally results in each blade acting as a network switch handling traffic for the same set of network stations. Each blade has a learning table of known addresses for associated network stations and packets that are passed through the blade. As a result, each blade can perform learning of MAC addresses independent of the other blades. This is desirable because learning is typically done in hardware and it avoids the overhead and difficulty of sharing information across blades. Normally, the address entries in the learning tables are flushed periodically in order to remove certain address problems. Least recently used addresses are therefore flushed from the various learning tables.

In current switch architectures, when a blade receives a packet for an unknown destination, the lookup for the address in the learning table fails, resulting in a destination lookup fail (DLF) condition. The blade then floods the packet out each port (for that VLAN) to the other blades. When return packets from the unknown station flow back through the blade, the blade updates its learning table with the new learned address such that the next packet to the station will be known and not cause a subsequent DLF condition.

There may be problems with VLAN groups and multi-blade trunking where the blades of a network traffic appliance could cause significant duplication of VLAN group forwarded traffic due to the need to repeatedly find a presently unknown address for a destination. For example, traffic hashed through one blade on the way into a network station and through another blade on the way out will be routed through different front panel switches in the network appliance. The MAC address of the destination network station may not be learned or learned via address resolution protocol (ARP) which is a request for a particular address, but then forgotten later by the network switching when the learning tables are flushed. The effect is that some traffic is always broadcast by the front panel switch so every switch in the network traffic appliance gets a copy of the packet in order to learn the previously unknown destination address. Each switch then redirects the traffic to the right switch associated with the destination network station. This has the undesirable effect of flooding the VLAN with packets from continuous DLF conditions.

Therefore, the fundamental problem with the switch-based architecture is when packets to and from a particular station always follow different paths. This situation results in a continuous DLF and sending flood packets to that station since the sending blades do not ever normally learn of the destination station address.

One proposed solution involves syncing the learning tables of all of the blades using software. This puts a heavy burden on the control plane of the network traffic appliance. Another possible solution is to program static MAC addresses into each blade. However this proposed solution increases the amount of blade hardware resources that must be devoted to storing and managing address data. Software learning disables the hardware learning functionality in the blades, and software is completely responsible for adding/removing entries to the learning tables of all the blades. Further, the learning rate would then be limited to how fast a processor can process the packets that need to be learned, which may slow down network traffic.

SUMMARY

According to one example, a method for preventing switches in a network from sending excessive flood packets is disclosed. The network routes packets between a source station having a source address and a destination station in the network having a destination address. A first packet directed toward the destination station over the network is received via an incoming traffic switch. The incoming traffic switch includes a table without the destination address. The first packet is flooded over a plurality of switches including a front facing switch. The flooded first packet is received at the front facing switch coupled to the destination station. The front facing switch has a table including the source address of the packet. The source address of packet is flushed from the table of the front facing switch. A response packet is sent from the destination station to the source station. The response packet is flooded to the incoming traffic switch. The flooded response packet is received at the incoming traffic switch. The table of the incoming traffic switch is updated with the destination address of the destination station.

Another example is a machine readable medium having stored thereon instructions for minimizing flood conditions on a series of switches. The medium includes machine executable code which when executed by at least one machine, causes the machine to receive a first packet having a destination address and a source address at an incoming traffic switch. The first packet is directed toward a destination station over the network. The incoming traffic switch includes a table without the destination address. The code causes the machine to flood the first packet over a plurality of switches including a front facing switch. The code causes the machine to receive the flooded first packet at the front facing switch coupled to the destination station. The front facing switch has a table including the source address. The code causes the machine to flush the source address from the table of the front facing switch. The code causes the machine sends a response packet from the destination station to the source station. The code causes the machine to flood the response packet to the incoming traffic switch. The code causes the machine to receive the flooded response packet at the incoming traffic switch. The code causes the machine to update the table of the incoming traffic switch with the destination address of the destination station.

Another example is a network traffic appliance for coupling to a network to exchange data packets between a source station having a source address and a destination station having a destination address coupled to the network. The network traffic appliance includes an incoming traffic blade including a table without the destination address. The incoming traffic blade receives incoming traffic packets including a first packet directed toward the destination station and floods the first packet over the network traffic appliance. An outgoing traffic blade transmits outgoing traffic packets. A front facing blade includes a table having the source address of the first packet and a driver that flushes the source address of the first packet from the table when the first packet is received. If a response packet from the destination station including the source address and the destination address is received by the front facing blade, the front facing blade floods the response packet the network traffic appliance including to the incoming traffic switch. When the flooded response packet is received at the incoming traffic blade, the table of the incoming traffic blade is updated with the destination address.

Additional aspects will be apparent to those of ordinary skill in the art in view of the detailed description of various embodiments, which is made with reference to the drawings, a brief description of which is provided below.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

Currently, network traffic control appliances with multiple blades suffer from the potential of a flood of packets based on a continuous DLF condition because certain blades never learn the destination of well-known network stations. The resulting continuous flooded packets result less than optimal network traffic flow.

Figure 1:
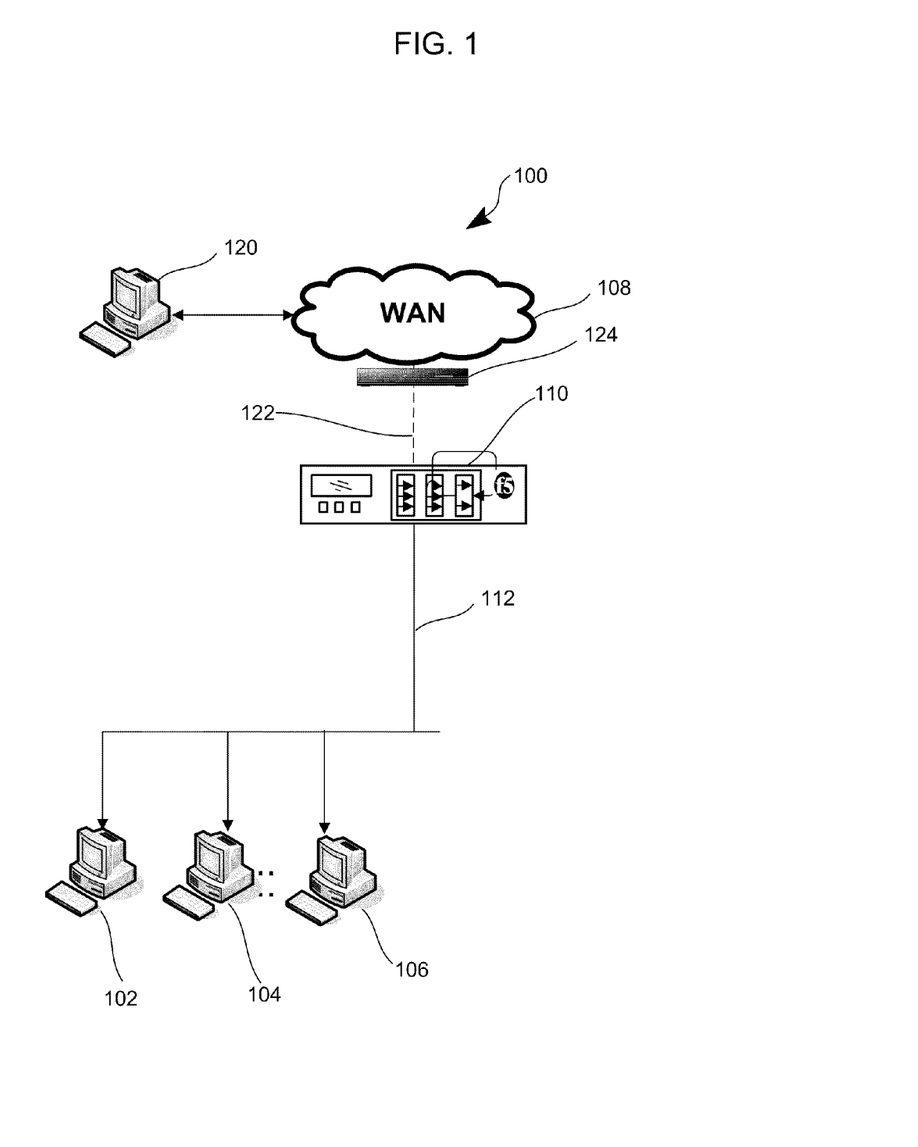
FIG. 1 is a block diagram of a network system using one example of preventing continuous DLF conditions on a network traffic appliance.

FIG. 1 is a block diagram of an example system 100 that may provide traffic access to various network stations 102, 104 and 106 to and from a wide area network 108. The network stations 102, 104 and 106 may each be coupled to a network traffic control appliance 110 that is part of a virtual LAN (VLAN) 112. The wide area network 108 may provide responses and requests according to the HTTP-based application RFC protocol in this example, but the principles discussed herein are not limited to this example and can include other application protocols such as non-TCP standards with similar characteristics. The system 100 may include a series of one or more external stations such as external station 120, which is a computer that may exchange packet traffic with the VLAN 112 via the wide area network 108. The VLAN 112 may be coupled to a trunk line 122, which is in turn coupled to an external switch 124 to route traffic for the VLAN 112 to and from the wide area network 108. The network traffic appliance 110 may be coupled to the various network stations 102, 104 and 106 through the VLAN 112 and serves to govern traffic between the network stations 102, 104 and 106 on the VLAN 112 and external stations such as computers accessible via the wide area network 108. In this example, the wide area network 108 may be the Internet.

The network stations 102, 104 and 106 in this example and the external station 120 may make requests for data from each other and other accessible stations. The data traffic to and from the VLAN 112 may be managed by the network traffic control appliance 110. Each of the network stations 102, 104 and 106 may have a unique address such as a media access control (MAC) address that allows the routing of data in packets. The packets may include the MAC address of the sending station and the address of the destination station.

The network traffic control appliance 110 may be interposed between the network stations 102, 104 and 106 and the external trunk line 122. The network traffic control appliance 110 may handle traffic to and from the external trunk line 122. The external trunk line 122 may be a high speed data communications line such as a T1 line. The network traffic control appliance 110 may include internal blades that serve as switches to route traffic to network stations such as network stations 102, 104 and 106. The blades thus may serve as switches to route traffic to and from the proper network stations and provide traffic routing on the VLAN 112. An example of a network traffic control appliance 110 may be the VIPRON™ application delivery controller product available from F5 Networks, Inc. of Seattle, Wash., although other network traffic appliances could be used.

Figure 2:
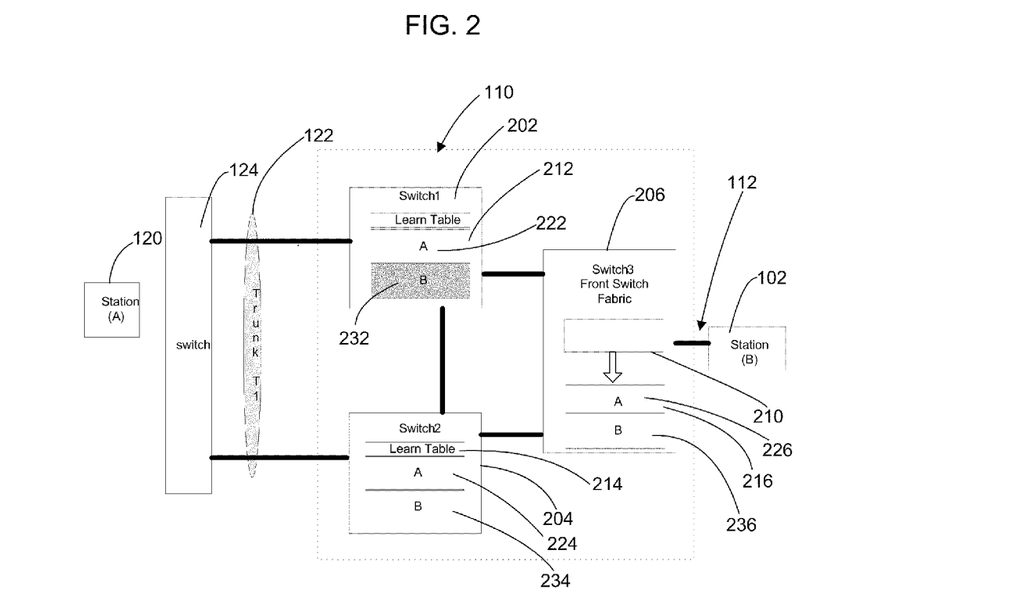
FIG. 2 is a block diagram of a network appliance in the system in FIG. 1 controlling a VLAN.

FIG. 2 is a block diagram of the network traffic control appliance 110 shown in FIG. 1 in relation to an external station such as the external station 120 accessible via the wide area network 108 and a network station such as the network station 102 on the VLAN 112. The network traffic control appliance 110 may include a series of blades 202, 204 and 206 that behave as switches to route packet traffic between the VLAN 112 and an external destination such as stations coupled to the wide area network 108 as shown in FIG. 1. In order to balance network traffic, the network traffic control appliance 110 may assign different blades to incoming and outgoing traffic. In this example, the blade 202 may handle incoming traffic while the blade 204 may handle outgoing traffic from the example trunk line 122.

Each of the blades 202, 204 and 206 may be coupled to multiple network stations such as the network stations 102, 104 and 106 in FIG. 1. In this example, the network stations such as the network station 102 may each have their own MAC address. Each of the blades 202, 204 and 206 may each include respective learning tables 212, 214 and 216. The learning tables 212, 214 and 216 may store entries of traffic destinations such as the address for external station 120 (A) and network station 102 (B) in respective table locations 222, 224 and 226 for the address of the external station 120 (A) and table locations 232, 234 and 236 for the address of the destination network station 102 (B). In this example, network traffic from the external station 120 (A) may flow through the external switch 124 which in turn routes the traffic through the trunk line 122 to the network traffic control appliance 110. The network traffic control appliance 110 may be set up to route incoming traffic to the blade 202. The outgoing traffic from the network traffic control appliance 110 may be set up to flow through the blade 204 which in turn routes the traffic out of the trunk line 122 to the external switch 124 to the external station 120 (A). The learning tables such as learning tables 212, 214 and 216 in the blades 202, 204 and 206 respectively may store destinations of known network stations and other addresses of sending external stations and also learned destinations that are broadcast to all of the blades 202, 204, 206 when an unknown address is received in respective table locations 222, 224, 226, 232, 234 and 236). A destination lookup failure condition may occur for any unknown address (i.e., an address not stored in the locations of the learning table) received on a packet for any of the blades 202, 204 and 206. In such a situation, the receiving blade may flood the packet out each port to each blade in the network traffic control appliance 110. This process insures that the blade that is coupled to the network station with the proper address may receive the particular flooded packet since all of the blades receive the flooded packet.

Figure 3A:
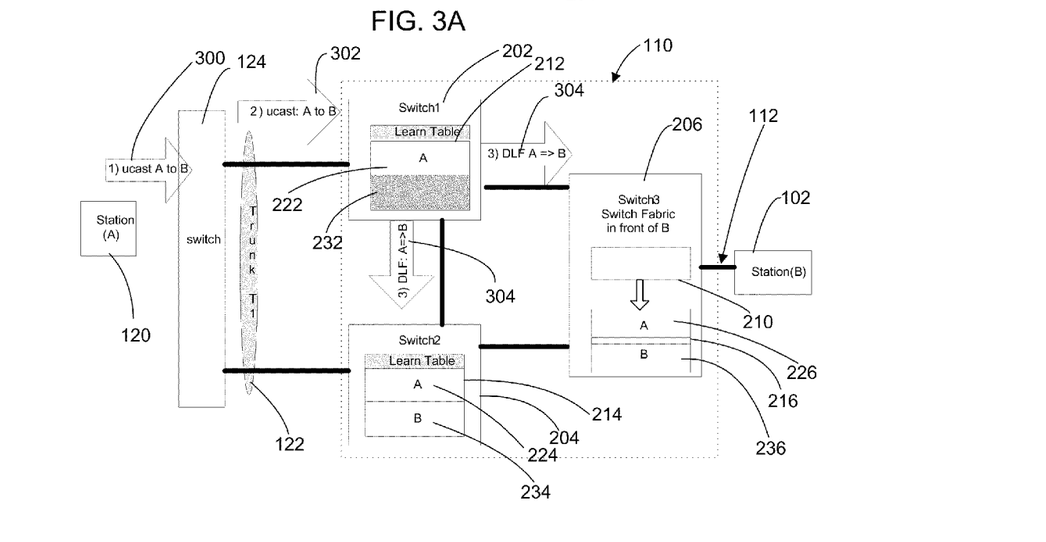
FIGS. 3A-3C are a series of block diagrams of network traffic flow in the network traffic appliance in FIG. 2 with front facing switch including a module that prevents continuous DLF conditions.
Figure 3B:
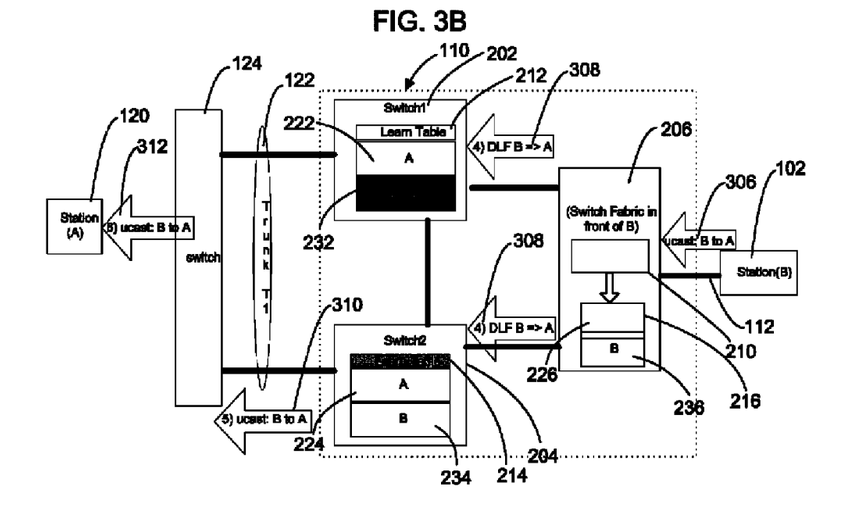
Figure 3C:
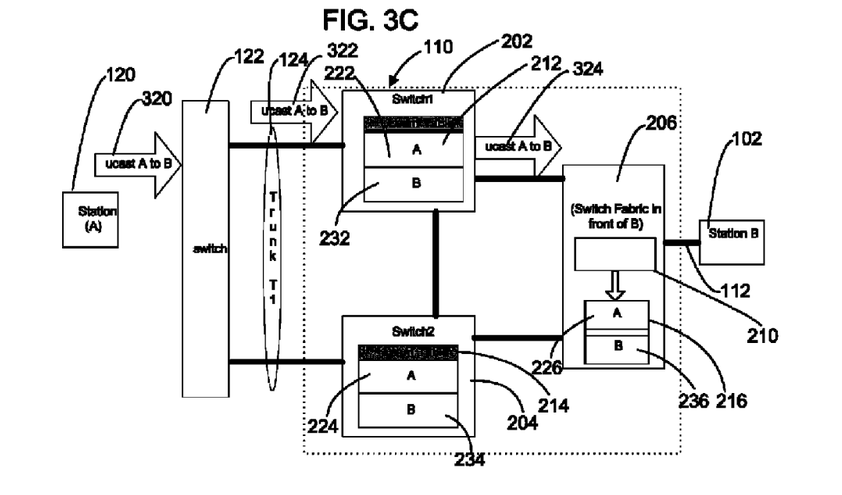

FIGS. 3A-3C are a series of block diagrams of the flow of data through the network traffic control appliance 110 shown in FIG. 2 that may include the process of preventing a continuous destination lookup failure condition on the VLAN 112. The problem of continuous flooding may be solved by a targeted flush process performed by the front facing switch, which is the blade 206 in the network traffic control appliance 110 in this example. The blade 206 in this example may be coupled directly to the well-known network station 102 (B). As will be explained, in this example, the targeted flush process may be performed for the address of a well-known station that is defined by predetermined criteria.

As will be explained, a driver 210 that will prevent continuous flooding may be installed on a front facing switch such as the blade 206 to recognize the receipt of a DLF flood packet for a network station such as the network station 102 (B) that should be well-known. The driver 210 may then cause the front facing switch 206 to then flush its own learned entry in the location 226 of the learning table 216 for the source address of the flooded packet. This may cause the reply sent to the now destination station 120(A) to trigger a DLF condition and flood the reply packet such that all other switches such as the blades 202 and 204 relearn the address of the well-known station and store the address in the respective table locations 232 and 234. In this example, this flood may occur once every learning period (normally 5 minutes) rather than every unknown packet.

In this example in FIG. 3A, the network station 102 may be designated as a well-known station in the VLAN 112. A particular network station may be designated as well-known according to the specific network traffic application that may be running on the network traffic appliance 110 or another device on the VLAN 112. For example, well-known stations could be designated according to stations coupled to one particular switch such as the forward facing switch 206 in this example. Of course, the flush could be performed based on all stations, some stations, or other combinations depending on the network design. In FIG. 3A, the external station 120 may send a unicast packet 300 to a network station such as the network station 102 in the VLAN 112 via the network traffic control appliance 110. The network traffic control appliance 110 in this example may route the incoming traffic such as the unicast packet 302 to the blade 202. The blade 202 in this example, may not have the address of the well-known destination station (network station 102 (B)) in the location 232 of its learning table 212 because it only handles incoming traffic and therefore never normally learns the address of the network station 102 because it never receives packets from the network station 102. Since the destination address of the network station 102 is unknown, the blade 202 may activate a destination lookup failure condition and thus floods the packet 304 out to the other blades in the network traffic control appliance 110 such as the blades 204 and 206.

FIG. 3B shows the condition of the blades in the network traffic control appliance 110 in FIG. 2 after the packet 304 is flooded from FIG. 3A. When the front facing switch, in this example blade 206, receives a packet 304 resulting from a destination lookup failure in FIG. 3A to the network station 102, the blade 206 flushes its learned entry in the location 226 of the learning table 216 for the address of the external station 120 (A) that sent the flooded packet. FIG. 3B shows that when a reply packet 306 is sent from the network station 102 (B) to the external station 120 (A), the packet, on reaching the blade 206, may result in a DLF flood packet 308 since the learning table 216 does not have a stored address for the external station 120 (A). The DLF flood packet 308 initiated from the blade 206 may update both the learning tables 212 and 214 by entering the address of the new source, network station 102 (B) (the previous destination of the first packet from FIG. 3A), in the respective table locations 232 and 234 of the learning tables 212 and 214 of blades 202 and 204 respectively. The blade 202 thus may learn the address of the network station 102 (B) from the DLF flood packet 308. Future packets addressed to the network station 102 may not require a DLF condition and a flood packet from the blade 202. The flood packet 308 sent to the blade 204 may be routed by a unicast packet 310 by the blade 204 to the trunk line 122 since the blade 204 is responsible for handling outgoing traffic for the network traffic control appliance 110. A unicast packet 312 may in turn be routed via the external switch 124 to the external station 120 (A).

FIG. 3C shows the resulting condition may eliminate the need for further flood packets initiated by a destination lookup failure based on the process described above. In FIG. 3C, the external station 120 (A) may send another unicast packet 320 to the VLAN 112. The network traffic control appliance 110 may receive the packet and route the packet as an incoming unicast packet 322 to the blade 202. Since the learning table 212 in the blade 202 may have the destination address of the well-known network station 102 (B) stored in the location 234 from the process described in FIGS. 3A and 3B above, the unicast packet 324 may be routed to the blade 206, which in turn routes the packet to the network station 102 (B) without the need for flooding the packet to the other blades in the network traffic control appliance 110.

Thus, the above process avoids static entries to the learning tables 212, 214 and 216 of the blades 202, 204 and 206 respectively. If an internal flooded packet occurs, this may indicate that one of the blades has lost its learning table entry of the address of the destination network station. In order to force each blade 202, 204 and 206 to relearn the well-known station, the front facing switch driver blade 206 may flush the address entry for the source MAC address of the flooded packet in the location 226 of its learning table 216. This may cause the blade 206 to flood the next reply from the well-known network station, which then is routed to all blades and updates the learning tables with the address of the well-known workstation. In this manner, continuous DLF is avoided within the normal operation of the network traffic control appliance 110.

The front facing switches such as the blade 206 may know the internal MAC addresses for well-known network stations in the VLAN 112. The process of targeted flushes of the learning table may be governed by the software driver 210 in the front facing switch blade 206.

The software driver 210 of the blade 206 may be rate controlled on the number of flushes performed after the learning table 216 is cleared. For example, the rate of flushes may be controlled based on how often packets from DLF conditions are received after the flush, which may indicate that a dropped address of a well-known network station may not be the cause of the DLF conditions in upstream blades. Alternatively, the targeted flushes may be performed based on statistics gathered by the blade 206 to determine the effectiveness of flushes relating to certain addresses. Alternatively, the driver 210 of the blade 206 may direct the flood packets to only blades that sent a flood packet.

Each of the network traffic control appliance 110 and individual blades, external station 120 and network stations 102, 104 and 106 may include a central processing unit (CPU), controller or processor, a memory, and an interface system that are coupled together by a bus or other link, although other numbers and types of each of the components and other configurations and locations for the components can be used. The processors in the blades may execute a program of stored instructions for one or more aspects of the methods and systems as described herein, including for eliminating a continuous DLF condition, although the processor could execute other types of programmed instructions. The memory may store these programmed instructions for one or more aspects of the methods and systems as described herein, including the method for preventing continuous flooding of packets as a result of a DLF condition, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium that is read from and/or written to by a magnetic, optical, or other reading and/or writing system that is coupled to the processor, may be used for the memory. The user input device may comprise a computer keyboard and a computer mouse, although other types and numbers of user input devices may be used. The display may comprise a computer display screen, such as a CRT or LCD screen by way of example only, although other types and numbers of displays could be used.

Although an example of the network traffic control appliance 110 and individual blades, external station 120 and network stations 102, 104 and 106 are described and illustrated herein in connection with FIGS. 1 and 2, each of the computers of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s).

Furthermore, each of the devices of the system 100 may be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software and networking arts.

In addition, two or more computing systems or devices may be substituted for any one of the systems in the system 100. Accordingly, principles and advantages of distributed processing, such as redundancy, replication, and the like, also can be implemented, as desired, to increase the robustness and performance of the devices and systems of the system 100. The system 100 may also be implemented on a computer system or systems that extend across any network environment using any suitable interface mechanisms and communications technologies including, for example, telecommunications in any suitable form (e.g., voice, modem, and the like), Public Switched Telephone Network (PSTNs), Packet Data Networks (PDNs), the Internet, intranets, a combination thereof, and the like.

Figure 4A:
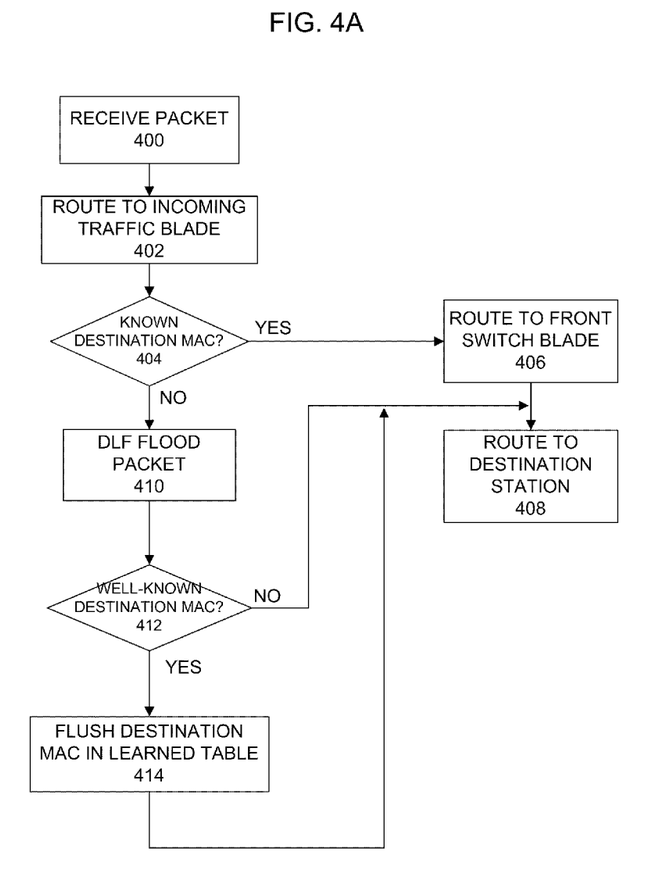
FIGS. 4A and 4B are flow charts of methods performed by a front facing switch of the example network traffic appliance in FIG. 2.
Figure 4B:
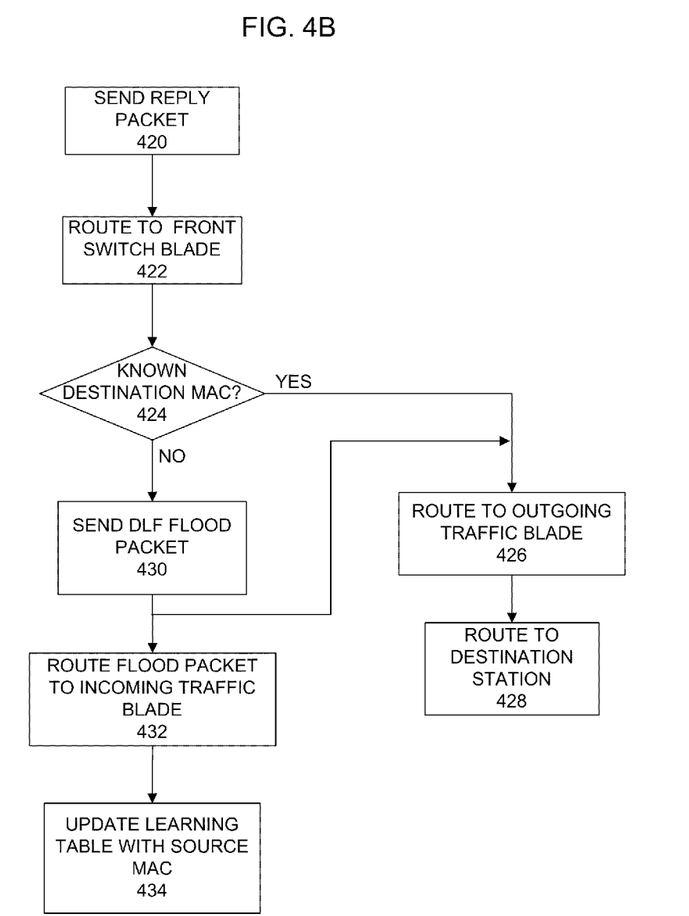

The operation of the example driver 210 in FIG. 2 to prevent continuous flooding of packets, shown in FIGS. 3A-3C, may be run on the network traffic control appliance 110, will now be described with reference to FIGS. 1 and 2 in conjunction with the flow diagrams shown in FIGS. 4A-4B. The flow diagrams in FIGS. 4A-4B are representative of example machine readable instructions for implementing the driver in the blade such as the blade 206 to prevent continuous flooding of packets. In this example, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the network traffic control appliance 110 could be implemented by software, hardware, and/or firmware. Also, some or all of the machine readable instructions represented by the flowcharts of FIGS. 4A-4B may be implemented manually. Further, although the example algorithm is described with reference to the flowcharts illustrated in FIGS. 4A-4B, persons of ordinary skill in the art will readily appreciate that many other methods of implementing the example machine readable instructions may alternatively be used. For example, the order of execution of the blocks may be changed, and/or some of the blocks described may be changed, eliminated, or combined.

In FIG. 4A, a packet may be initially received (400) by the network traffic control appliance 110 to a station external from the VLAN 112 such as the external station 120 in FIG. 1. The packet may include the source address corresponding to the address of the external station 120 and a destination address for a network station such as network station 102 that is part of a network such as the VLAN 112. The packet is routed to an incoming traffic blade such as the blade 202 in FIG. 2 (402). In this example, the network traffic control appliance 110 may be configured to efficiently manage traffic flow such that various blades such as the blade 202 in FIG. 2 function as switches that only handle incoming traffic.

The incoming traffic blade 202 may check the destination address of the packet and determine if the destination address is known (404) by determining if the destination address is an entry in the learning table 212 such as in one of the table locations 222 and 224. If the destination address is known (already stored in the table location 224), the incoming traffic blade 202 may route the packet to the front facing switch blade 206 for the destination network station 102 (406). The front facing switch blade 206 then may route the packet to the network station 102 (408).

However, since the incoming traffic blade 202 in this example may only route incoming traffic alone, there is a substantial likelihood that the table locations such as locations 222 and 224 of the learning table 212 do not include learned entries of the destination addresses of network stations on the VLAN 112. If the incoming traffic blade 202 does not know the destination address (e.g., the learning table is without the destination address), the incoming traffic blade 202 may determine a destination lookup failure condition and sends a DLF flood packet (410) to all of the blades in the network traffic control appliance 110. The front facing switch blade 206 receives the DLF flood packet and may determine whether the packet is directed toward a well-known station (412). Of course it is to be understood that every flood packet may result in this condition resulting in the targeted flush for each instance. Otherwise, the blade 206 may perform the targeted flush according to a metric such as excess flooding from the same destination address. The flush may be performed based on a specific application on the domain within the network traffic control appliance 110. The flush may also be based on the well-known addresses within the domain as defined by administrative rule.

If the destination address is not a well-known station, the front facing switch blade may route the packet to the proper destination station 102. If the destination address is for a well-known station, the front switch blade 206 may initiate a flush of the source address entry in its learning table 216 (414).

FIG. 4B is a flow diagram of the process that may teach blades, such as the blade 202, the destination addresses of known network stations, such as the network station 102 via packet flooding. The network station 102 may send a reply message (420) to the previous destination station, in this example the external station 120. The reply packet may be sent to the front facing switch blade 206 (422). The front facing switch blade 206 may determine whether the destination address of the reply packet is known (424). In normal circumstances, the learning table 216 of the front facing switch blade 206 will include the destination address of the external station in the table location 226 since the network station 102 previously received a packet from the external station 120. If the destination address is known, the front switch blade 206 may route the reply packet via a unicast to the outgoing traffic switch (426), which is the blade 204 in this example. The outgoing blade 204 in turn may route the reply packet according to the destination address to the destination external station 120 via the wide area network 108 in FIG. 1 from the stored address (A) in the table location 234.

However, as explained above, in cases where a well-known station such as the network station 102 has received a packet that had to be flooded as explained in above with reference to FIG. 4A, the learning table 216 of the front facing switch blade 206 will have flushed the destination address from the table location 236. Thus, the destination address of the reply packet will not be available to the front facing switch blade 206 because the learning table 216 does not have the address entry. The front facing switch blade 206 therefore may determine a destination lookup failure condition and send a DLF flood packet (430). The DLF flood packet may be received by the outgoing traffic switch such as the blade 204 (426) which will proceed to route the packet to the proper destination, the external station 120 in this example. Since the DLF flood packet may be flooded to all of the blades in the network traffic control appliance 110, the DLF flood packet is also routed to the incoming traffic blade 202. Since the incoming traffic blade 202 does not have the destination address of the external station 120 in this example, it may update the location 232 of the learning table 212 (434) upon receiving the DLF flood packet with the unknown destination address (A). In this manner, the incoming traffic blade 202 learns the address of the network station previously unknown to it. In this manner, future packets received by the incoming traffic blade 202 with the destination of the network station 102 may be unicast to the front switch blade 206 for routing to the networks station 102, which prevents a continuous DLF condition resulting in additional flood packets to all of the blades of the network traffic control appliance 110.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. For example, different non-TCP networks may be selected by a system administrator. The order that the measures are implemented may also be altered. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for preventing switches in a network from sending excessive flood packets, the network routing packets between a source station having a source address and a destination station in the network having a destination address, the method comprising:

receiving a first packet directed toward the destination station over the network via an incoming traffic switch, the incoming traffic switch including a table without the destination address;

flooding the first packet over a plurality of switches including a front facing switch;

receiving the flooded first packet at the front facing switch coupled to the destination station, the front facing switch having a table including the source address of the packet;

flushing the source address of the first packet from the table of the front facing switch in response to receiving the flooded first packet at the front facing switch;

receiving a response packet at the front facing switch from the destination station directed toward the source station;

flooding the response packet to the incoming traffic switch;

receiving the flooded response packet at the incoming traffic switch; and updating the table of the incoming traffic switch with the destination address of the destination station.

2. The method in claim 1, further comprising storing the number of times a response packet is flooded by the front facing switch.

3. The method of claim 1, wherein flushing the source address is controlled based on the number of flooded first packets previously received by the front facing switch.

4. The method of claim 1, wherein the front facing switch and the incoming traffic switches are blades in a network traffic appliance.

5. The method in claim 1, wherein the response packet is flooded on a periodic basis.

6. The method in claim 1, wherein the response packet is only flooded to switches that previously flooded packets from the source station.

7. The method of claim 1, further comprising determining whether the destination station is a well-known station according to predetermined criteria and only proceeding to flush the source address of packet if the destination station is a well-known address.

8. The method of claim 7, wherein the predetermined criteria is whether the destination station is coupled to a designated switch in the network.

9. A machine readable non-transitory medium having stored thereon instructions for minimizing flood conditions on a series of switches, comprising machine executable code which when executed by at least one machine, causes the machine to:
   receive a first packet having a destination address and a source address at an incoming traffic switch, the first packet directed toward a destination station over the network, the incoming traffic switch including a table without the destination address;
   flood the first packet over a plurality of switches including a front facing switch;
   receive the flooded first packet at the front facing switch coupled to the destination station, the front facing switch having a table including the source address;
   flush the source address from the table of the front facing switch in response to receiving the flooded first packet at the front facing switch;
   receive a response packet at the front facing switch from the destination station to directed toward the source station;
   flood the response packet to the incoming traffic switch;
   receive the flooded response packet at the incoming traffic switch; and
   update the table of the incoming traffic switch with the destination address of the destination station.

10. The machine readable medium in claim 9, wherein the instructions cause the machine to store the number of times a response packet is flooded by the front facing switch.

11. The machine readable medium in claim 9, wherein the flush of the source address is controlled based on the number of flooded first packets previously received by the front facing switch.

12. The machine readable medium in claim 9, wherein the front facing switch and the incoming traffic switches are blades in a network traffic appliance.

13. The machine readable medium in claim 9, wherein the response packet is flooded on a periodic basis.

14. The machine readable medium in claim 9, wherein the instructions further direct the machine to only flood the response packet to switches that previously flooded packets from the source station.

15. The machine readable medium in claim 9, wherein the instructions further direct the machine to determine whether the destination station is a well-known station according to predetermined criteria and only proceeding to flush the source address of packet if the destination station is a well-known address.

16. The machine readable medium in claim 15, wherein the predetermined criteria is whether the destination station is coupled to a designated switch in the network.

17. A network traffic appliance for coupling to a network to exchange data packets between a source station having a first address and a destination station coupled to the network and having a second address, the network traffic appliance comprising:
   an incoming traffic blade including a table without the second address, the incoming traffic blade receiving incoming traffic packets from the source station including a first packet having the first address and the second address directed toward the destination station and flooding the first packet over the network traffic appliance;
   an outgoing traffic blade that transmits outgoing traffic packets back toward the source station; and
   a front facing blade including a table having the first address of the first packet and a driver that flushes the first address of the first packet from the table when the first packet is received; and
   wherein if a response packet from the destination station including the first address of the source station and the second address of the destination station is received by the front facing blade, the front facing blade floods the response packet within the network traffic appliance including to the incoming traffic blade and when the flooded response packet is received at the incoming traffic blade, the table of the incoming traffic blade is updated with the second address.

18. The network traffic appliance of claim 17, wherein the source station is external to the network and the destination station is a network station.

19. The network traffic appliance of claim 17 wherein the driver stores the number of times a response packet is flooded by the front facing blade.

20. The network traffic appliance of claim 17, wherein flushing the first address is controlled based on a number of flooded first packets previously received by the front facing blade.

21. The network traffic appliance of claim 17, wherein the source packet is flooded on a periodic basis.

22. The network traffic appliance of claim 17, wherein the front facing blade only floods the response packet to blades in the network traffic appliance that previously flooded packets from the source station.

23. The network traffic appliance of claim 17, wherein the driver determines whether the destination station is a well-known station according to predetermined criteria and only proceeds to flush the first address of the first packet if the destination station is a well-known address.

24. The network traffic appliance of claim 23, wherein the predetermined criteria is whether the destination station is coupled to a designated blade in the network traffic appliance.

* * * * *